(12) United States Patent
Matsumoto (10) Patent No.: US 10,257,872 B2
(45) Date of Patent: Apr. 9, 2019

(54) USER TERMINAL AND PROCESSOR

(71) Applicant: KYOCERA CORPORATION, Kyoto (JP)

(72) Inventor: Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 33 days.

(21) Appl. No.: 15/308,957

(22) PCT Filed: May 8, 2015

(86) PCT No.: PCT/JP2015/063376
§ 371 (c)(1),
(2) Date: Nov. 4, 2016

(87) PCT Pub. No.: WO2015/170766
PCT Pub. Date: Nov. 12, 2015

(65) Prior Publication Data
US 2017/0079084 A1    Mar. 16, 2017

Related U.S. Application Data

(60) Provisional application No. 61/991,015, filed on May 9, 2014.

(51) Int. Cl.
*H04W 76/14* (2018.01)
*H04W 92/18* (2009.01)
*H04W 8/00* (2009.01)
*H04W 72/04* (2009.01)
*H04W 72/12* (2009.01)
*H04L 5/00* (2006.01)
*H04W 72/02* (2009.01)

(52) U.S. Cl.
CPC ........... *H04W 76/14* (2018.02); *H04L 5/0037* (2013.01); *H04W 8/005* (2013.01); *H04W 72/02* (2013.01);
(Continued)

(58) Field of Classification Search
CPC ..... H04W 76/14; H04W 92/18; H04W 8/005; H04W 72/0446; H04W 72/1205;
(Continued)

(56) References Cited

U.S. PATENT DOCUMENTS

| | | | |
|---|---|---|---|
| 2013/0223397 A1* | 8/2013 | Kim | H04L 5/0023 370/329 |
| 2015/0049696 A1 | 2/2015 | Furukawa et al. | |
| 2016/0183276 A1* | 6/2016 | Marinier | H04W 72/02 370/329 |

FOREIGN PATENT DOCUMENTS

JP    2013-229847 A    11/2013

OTHER PUBLICATIONS

Extended European Search Report issued by the European Patent Office dated Nov. 22, 2017, which corresponds to EP15789472.6-1857 and is related to U.S. Appl. No. 15/308,957.

(Continued)

*Primary Examiner* — Mandish K Randhawa
(74) *Attorney, Agent, or Firm* — Studebaker & Brackett PC (57) ABSTRACT

A user terminal according to present embodiment comprises a transmitter configured to transmit scheduling assignment information indicating a time-frequency location of a D2D data resource by which user data in D2D communication that is direct Device to Device communication is transmitted. The frequency location of the D2D data resource is determined on the basis of a persistent table where the frequency location of the D2D data resource and the frequency location of the scheduling assignment information are made to correspond to each other. The time location of the D2D data resource is determined on the basis of an identifier included in the scheduling assignment information.

4 Claims, 10 Drawing Sheets

(52) U.S. Cl.
CPC ... *H04W 72/0446* (2013.01); *H04W 72/0453* (2013.01); *H04W 72/1205* (2013.01); *H04W 92/18* (2013.01); *H04W 72/1278* (2013.01)

(58) Field of Classification Search
CPC ............. H04W 72/02; H04W 72/0453; H04W 72/1278; H04L 5/0037
See application file for complete search history.

(56) References Cited

OTHER PUBLICATIONS

LG Electronics, "Control design for D2D broadcast communication", 3GPP TSG RAN WG1 Meeting #76bis, R1-141349, Mar. 31-Apr. 4, 2014, pp. 1-6, Shenzhen, China.
Kyocera, "Design details of scheduling assignments", 3GPP TSG RAN WG1 Meeting #77, R1-142480, May 19-23, 2014, Seoul, Korea.
International Search Report issued in PCT/JP2015/063376; dated Jul. 14, 2015.
Written Opinion issued in PCT/JP2015/063376; dated Jul. 14, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.
Catt; Control for D2D communication; 3GPP TSG RAN WG1 Meeting #76bis; R1-141193; Mar. 31-Apr. 4, 2014; pp. 1-3; Shenzhen, China.
Zte; Scheduling-based D2D Communication Resource Allocation; 3GPP TSG-RAN WG1 #76bis; R1-141427; Mar. 31-Apr. 4, 2014; pp. 1-4; Shenzhen, China.

\* cited by examiner

| CONTENTS | BITS |
|---|---|
| UE ID (TX UE ID OR TARGET ID) | 8 BITS |
| MCS | 5 BITS |
| RESERVED | 3 BITS |
| TOTAL | 16 BITS |

FIG. 14

# USER TERMINAL AND PROCESSOR

TECHNICAL FIELD

Embodiments of the present disclosure relate to a user terminal and a processor used in a mobile communication system.

BACKGROUND ART

In 3GPP (3rd Generation Partnership Project) which is a project aiming to standardize a mobile communication system, the introduction of Device to Device (D2D) proximity service is discussed as a new function after Release 12 (see Non Patent Document 1).

The D2D proximity service (D2D ProSe) is a service enabling direct Device-to-Device communication within a synchronization cluster including a plurality of synchronized user terminals. The D2D proximity service includes a D2D discovery procedure (Discovery) in which a proximal terminal is discovered and D2D communication (Communication) that is direct Device-to-Device communication.

In order to make a D2D proximity service available while decreasing a load of a base station, it is assumed that a transmission-side user terminal that transmits user data in D2D communication transmits scheduling assignment information (SA: Scheduling Assignment) indicating a time-frequency location of a D2D data resource used for receiving the user data.

PRIOR ART DOCUMENTS

Non Patent Document

Non Patent Document 1: 3GPP technical report "TR 36.843 V12.0.1" Mar. 27, 2014

SUMMARY

A user terminal according to one embodiment comprises a transmitter configured to transmit scheduling assignment information indicating a time-frequency location of a D2D data resource by which user data in D2D communication that is direct Device to Device communication is transmitted. The frequency location of the D2D data resource is determined on the basis of a persistent table where the frequency location of the D2D data resource and the frequency location of the scheduling assignment information are made to correspond to each other. The time location of the D2D data resource is determined on the basis of an identifier included in the scheduling assignment information.

DESCRIPTION OF THE EMBODIMENT

Overview of Embodiment

Here, when the scheduling assignment information includes a large amount of information for indicating a time-frequency location of a D2D data resource, many radio resources are needed for the scheduling assignment information. As a consequence, there is a problem in that an amount of radio resources to be assigned to the D2D data resource decreases.

Therefore, an object of the present application is to enable a decrease of an amount of information indicating a time-frequency location of a D2D data resource while scheduling assignment information appropriately indicates the time and the frequency location of the D2D data resource.

A user terminal according to embodiment comprises a transmitter configured to transmit scheduling assignment information indicating a time-frequency location of a D2D data resource by which user data in D2D communication that is direct Device to Device communication is transmitted. The frequency location of the D2D data resource is determined on the basis of a persistent table where the frequency location of the D2D data resource and the frequency location of the scheduling assignment information are made to correspond to each other. The time location of the D2D data resource is determined on the basis of an identifier included in the scheduling assignment information.

In the embodiment, the time location of the D2D data resource is randomly determined on the basis of the identifier.

In the embodiment, the identifier indicates an identifier of the user terminal or an identifier of a user terminal to which the D2D data resource is transmitted.

A processor according to the embodiment controls a user terminal. The processor is configured to execute a process for transmitting scheduling assignment information indicating a time-frequency location of a D2D data resource by which user data in D2D communication that is direct Device to Device communication is transmitted. The frequency location of the D2D data resource is determined on the basis of a persistent table where the frequency location of the D2D data resource and the frequency location of the scheduling assignment information are made to correspond to each other. The time location of the D2D data resource is determined on the basis of an identifier included in the scheduling assignment information.

Embodiment

Hereinafter, the embodiment in a case where the present application is applied to an LTE system will be described.

System Configuration

Figure 1:
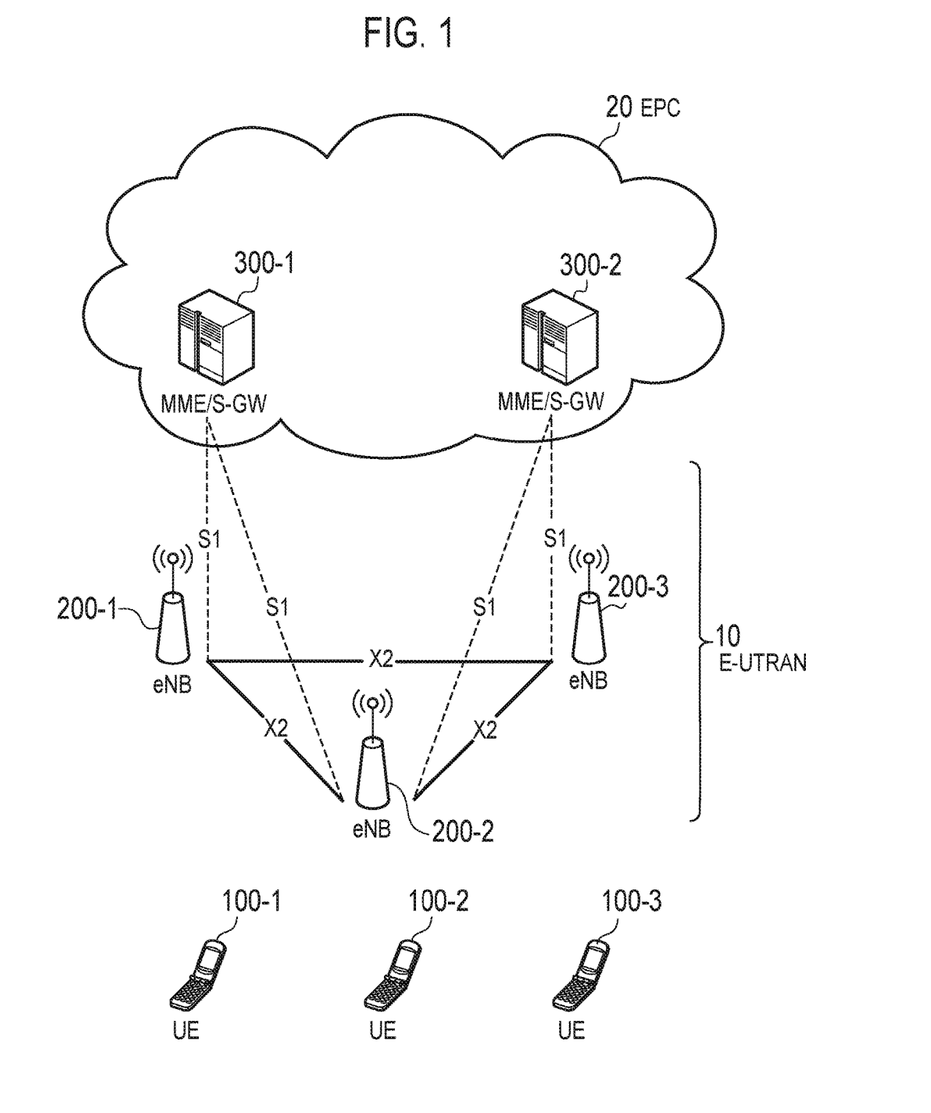
FIG. 1 is a configuration diagram of an LTE system according to an embodiment.

FIG. 1 is a configuration diagram of an LTE system according to an embodiment. As shown in FIG. 1, the LTE system according to the embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface.

Figure 2:
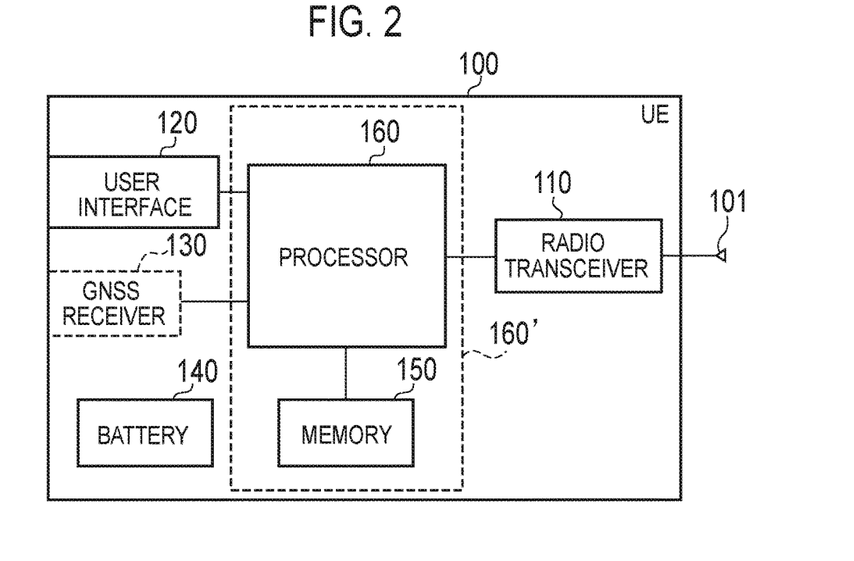
FIG. 2 is a block diagram of a UE according to the embodiment.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 corresponds to a storage unit, and the processor 160 corresponds to a control unit. The UE 100 may not have the GNSS receiver 130. Furthermore, the memory 150 may be integrally formed with the processor 160, and this set (that is, a chip set) may be a processor 160' constituting the control unit.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
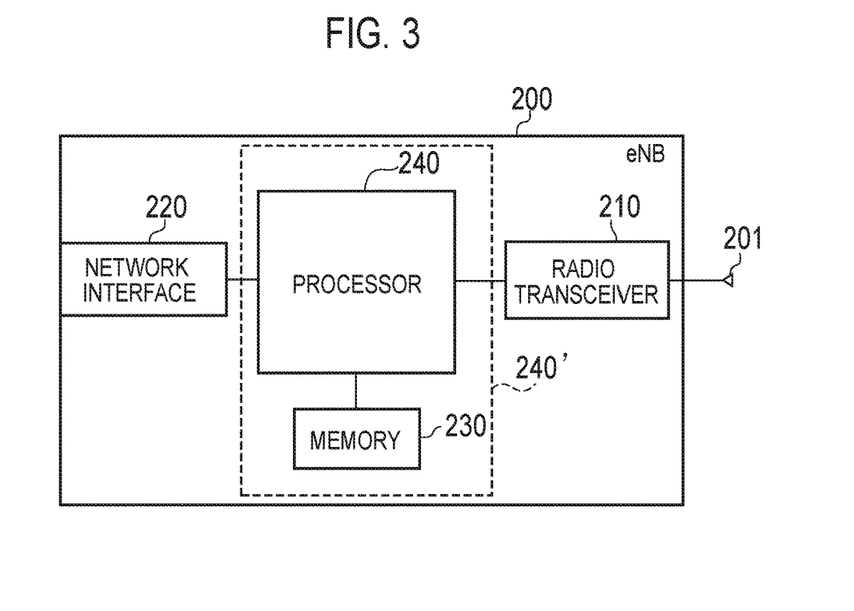
FIG. 3 is a block diagram of an eNB according to the embodiment.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240' constituting the control unit.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
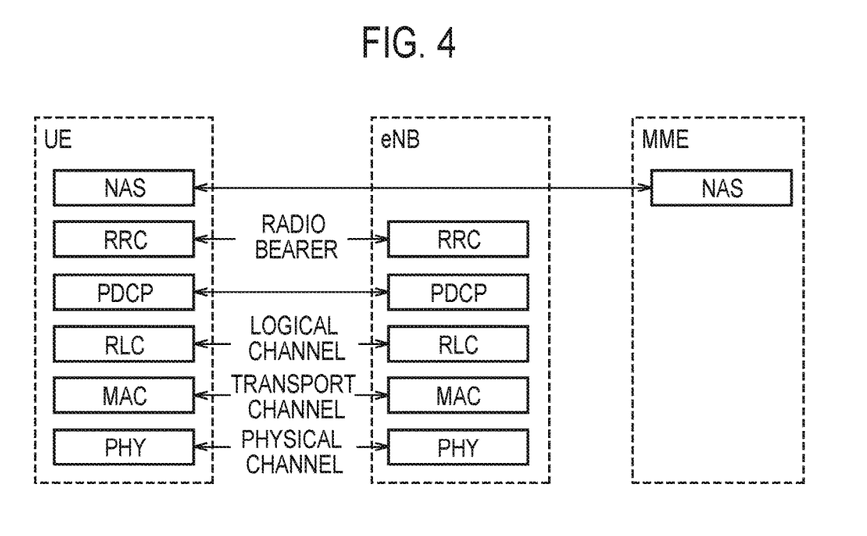
FIG. 4 is a protocol stack diagram according to the embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a transport format of an uplink and a downlink (a transport block size, a modulation and coding scheme) and a scheduler to decide (schedule) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
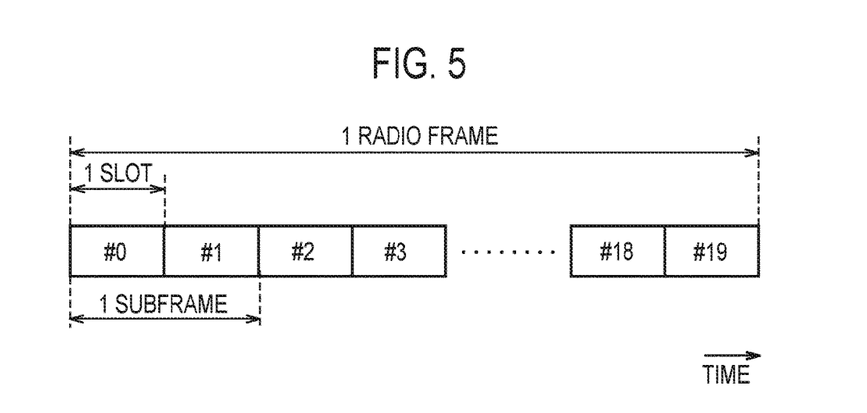
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(D2D Proximity Service)

A D2D proximity service will be described, below. The LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct Communication.

A scenario in which all the UEs 100 forming the synchronization cluster are located inside a cell coverage is called "In coverage". A scenario in which all the UEs 100 forming the synchronization cluster are located outside a cell coverage is called "Out of coverage". A scenario in which some UEs 100 in the synchronization cluster are located inside a cell coverage and the remaining UEs 100 are located outside the cell coverage is called "Partial coverage".

In "In coverage", the eNB 200 is a D2D synchronization source, for example. A D2D asynchronization source, from which a D2D synchronization signal is not transmitted, is synchronized with the D2D synchronization source. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in the D2D synchronization procedure in which a device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information can be conveyed than the D2DSS. The PD2DSCH conveys the above-described D2D resource information (the Discovery resource information and the Communication resource information). Alternatively, when the D2DSS is associated with the D2D resource information, the PD2DSCH may be rendered unnecessary.

In the D2D discovery procedure, a discovery signal for discovering a proximal terminal (hereinafter, "Discovery signal") is transmitted. Types of the D2D discovery procedure include: a first discovery type (Type 1 discovery) in which a radio resource not uniquely assigned to the UE 100 is used for transmitting a Discovery signal; and a second discovery type (Type 2 discovery) in which a radio resource uniquely allocated to each UE 100 is used for transmitting a Discovery signal. In the second discovery type, a radio resource individually allocated to each transmission of a Discovery signal or a radio resource allocated semi-persistently is used.

Further, Modes of the D2D communication included: a first mode (Mode 1) in which the eNB 200 or a relay node allocate a radio resource for transmitting D2D data (D2D data and/or control data); and a second mode (Mode 2) in which the UE 100 selects a radio resource for transmitting D2D data. The UE100 performs the D2D communication in any one of the modes. For example, a UE 100 in the RRC connected state performs the D2D communication in the first mode and a UE 100 in out of coverage performs the D2D communication in the second mode.

(Relationship Between SA Resource and Data Resource)

Figure 6:
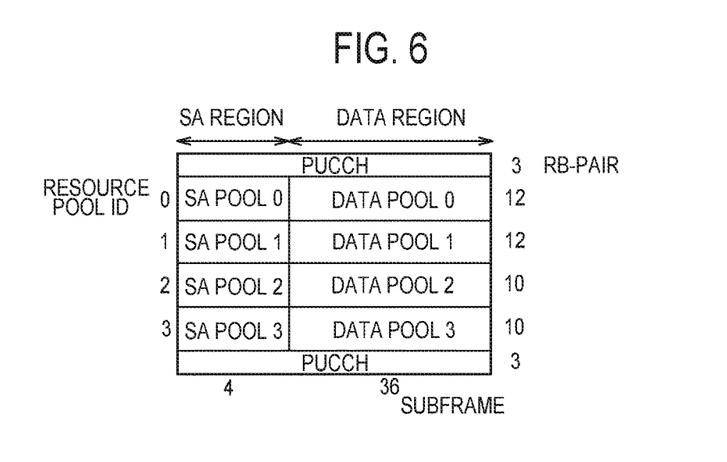
FIG. 6 is a diagram for describing an arrangement of an SA resource pool and a data resource pool in Mode 1.
Figure 7:
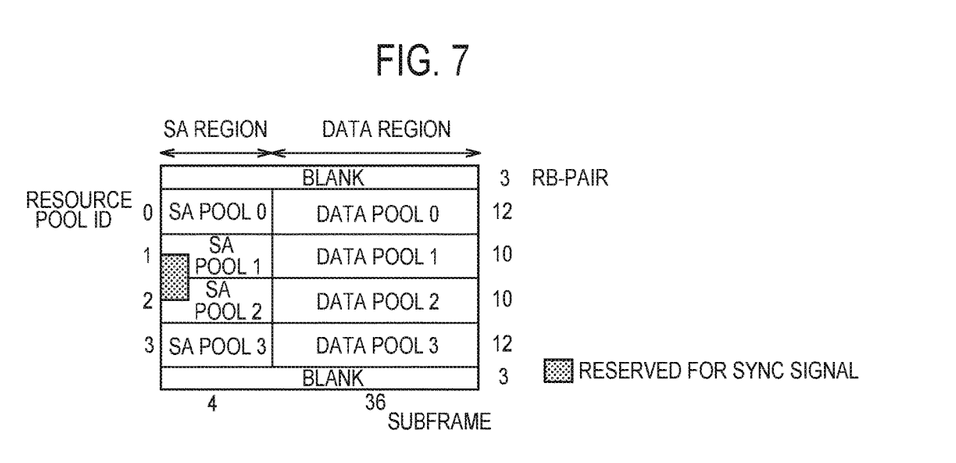
FIG. 7 is a diagram for describing an arrangement of an SA resource pool and a data resource pool in Mode 2.
Figure 8:
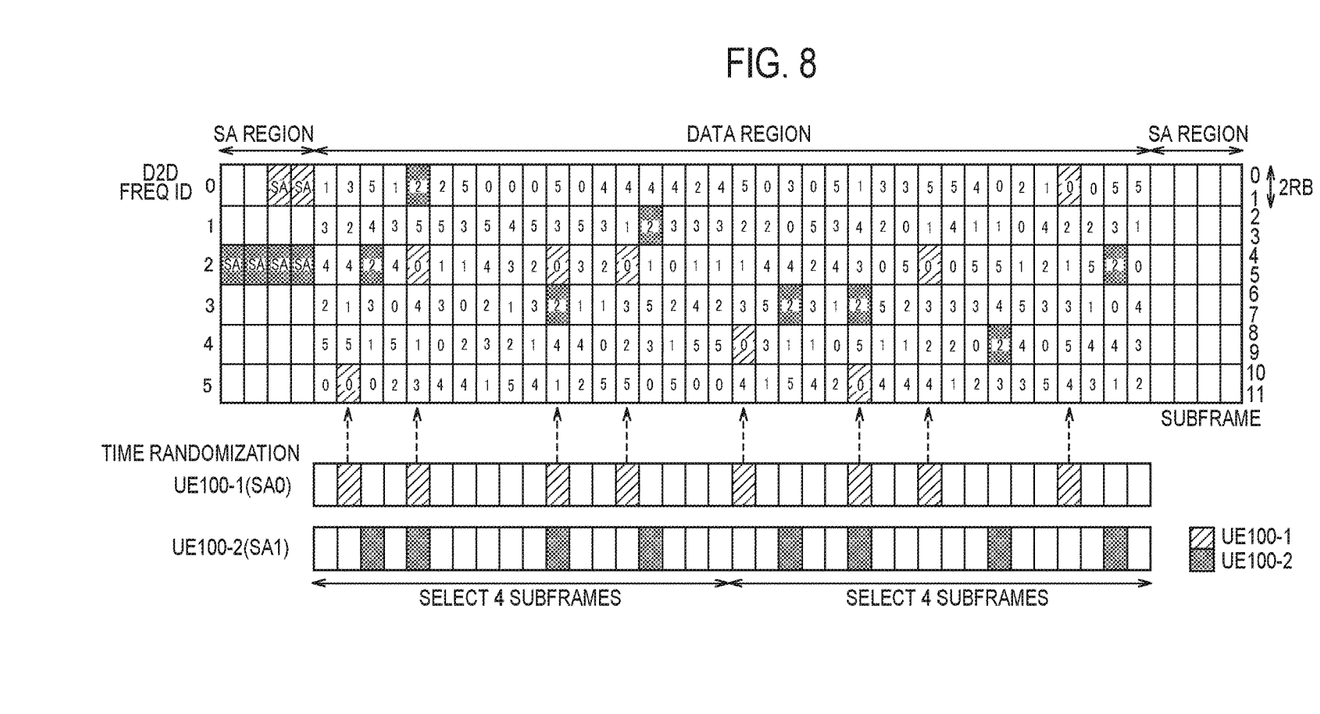
FIG. 8 is a diagram for describing a relationship between an SA resource and a data resource.

Next, an SA resource (scheduling assignment information-use resource) and a data resource will be described by using FIG. 6 to FIG. 8. FIG. 6 is a diagram for describing an arrangement of an SA resource pool and a data resource pool in Mode 1. FIG. 7 is a diagram for describing an arrangement of an SA resource pool and a data resource pool in Mode 2. FIG. 8 is a diagram for describing a relationship between an SA resource and a data resource.

Firstly, a radio resource used in a first mode (Mode 1), which is a mode for D2D communication, will be described. In the first mode, a radio resource for D2D communication (Communication resource) as shown in FIG. 6 is used.

Specifically, a radio resource for D2D communication in the first mode is divided, in a time direction, into an SA region and a data region. The widths in time and frequency directions of a radio resource for D2D communication and a cycle of a radio resource for D2D communication are persistent. The width in the time direction of a radio resource for D2D communication is preferably a multiple of 20 msec in order to be exclusively used for VoIP. Further, to reduce a delay when VoIP is generated, the width in the time direction of a radio resource for D2D communication is preferably 40 msec.

The SA region is divided, in the frequency direction, into a plurality of SA resource pools (SA pools 0 to 3) when a frequency band is 10 MHz. For example, the width in the frequency direction of an SA resource pool is 10 RBs or 12 RBs, and the width in the time direction of an SA resource pool is four subframes.

The data region is divided, in the frequency direction, into a plurality of data resource pools (Data pools 0 to 3). For example, the width in the frequency direction of a data resource pool is 10 RBs or 12 RBs, and the width in the time direction of a data resource pool is 36 subframes.

Each of the plurality of SA resource pools and each of the plurality of data resource pools correspond in the time direction. For example, the SA resource pool 0 and the data resource pool 0 are made to correspond to each other by a resource pool ID "0".

It is noted that a radio resource for D2D communication is arranged to be sandwiched by PUCCHs in the frequency direction.

Next, a radio resource used for a second mode (Mode 2) will be described. In the first mode, the radio resource as shown in FIG. 7 is used.

A radio resource for D2D communication in the second mode has a configuration similar to a radio resource for D2D communication in the first mode. It is noted that in the SA resource region, a radio resource pool (D2D synchronization pool) for transmitting a D2D synchronization signal is arranged.

Specifically, the D2D synchronization pool is arranged in the time direction from a head symbol of the SA resource region to a predetermined symbol (for example, 0 to 13 symbols), and is arranged, in the frequency direction, over several RBs (for example, 6 RBs) in the center in the frequency direction of the radio resource for D2D communication.

In the second mode, which an SA resource pool is used is determined by the UE 100 that transmits a D2D synchronization signal.

It is noted that in the radio resource for D2D communication in the second mode, a portion corresponding to the PUCCH in the first mode is blank.

Next, a method for determining a location of the data resource will be described. It is noted that an SA resource pool and a data resource pool shown in FIG. 8 are an SA resource pool 0 and a data resource pool 0, for example.

As shown in FIG. 8, the SA resource pool and the data resource pool are divided into the same unit size. The width in the time direction of one unit size is one subframe, and the width in the frequency direction of one unit size is 2 RBs.

Here, a frequency location of a data resource and a frequency location of SA (specifically, D2D frequency ID) are made to correspond to each other. Specifically, as shown in FIG. 8, each of the plurality of identical data resources in the time direction is made to correspond to any one of D2D frequency frequencies IDs (0 to 5), and each frequency ID in the frequency direction does not overlap and is arranged randomly. As a result, interference based on a difference in received power (so-called In-band emission) can be restrained.

A random pattern of each frequency ID may be a pattern determined on the basis of an SFN (subframe number). Information indicating the determined random pattern may be included in SA or a D2DSS. Alternatively, a random pattern of each frequency ID may be persistent.

The frequency location of a data resource is determined on the basis of a persistent table as shown in FIG. 8 where the frequency location of an SA resource and the frequency of a data resource are made to correspond to each other. For example, the eNB 200 (or a relay node) that assigns a radio resource in the first mode assigns, to a UE 100-1, the SA resource having the frequency ID corresponding to "0".

For example, the UE 100-1 using the SA resource corresponding to the frequency ID of "0" determines the data resource corresponding to the frequency ID of "0", on the basis of the persistent table. A UE 100-2 using the SA resource corresponding to the frequency ID of "2" determines the data resource corresponding to the frequency ID of "2", on the basis of the persistent table.

On the other hand, the time location of a data resource is determined on the basis of the identifier of the UE 100. For example, the UE 100-1 determines the time location of a data resource by a random pattern determined on the basis of the ID of the UE 100-1 from which SA is transmitted. Therefore, the time location of a data resource is randomly determined on the basis of the identifier of the UE 100. As a result, interference based on a difference in transmission power (so-called In-band emission) can be restrained.

Similarly to the UE 100-1, the UE 100-2 may determine the time location of a data resource by a random pattern determined on the basis of the ID of the UE 100-2. Alternatively, the UE 100-2 may determine the time location of a data resource by a random pattern determined on the basis of the UEID to which user data is transmitted.

It is noted that in the present embodiment, the UE 100 determines four data resources, from each of a first half (18 subframes) of the data region and a second half (18 subframes) of the data region. Therefore, one item of SA indicates eight data resources.

The random rule relating to the frequency location of a data resource and the random rule relating to the time location of a data resource are preferably a different rule.

It is noted that number of times of re-transmissions of user data may be persistent at four, for example. As a result, a new data identifier (NDI) indicating switching of data may not be included in the user data, and thus, it is possible to effectively use a radio resource.

Further, when the number of times of re-transmissions of user data is persistent, an RV index pattern may be persistent. For example, the RV index pattern may be persistent at (0, 2, 3, 1).

(SA)

Figure 9:
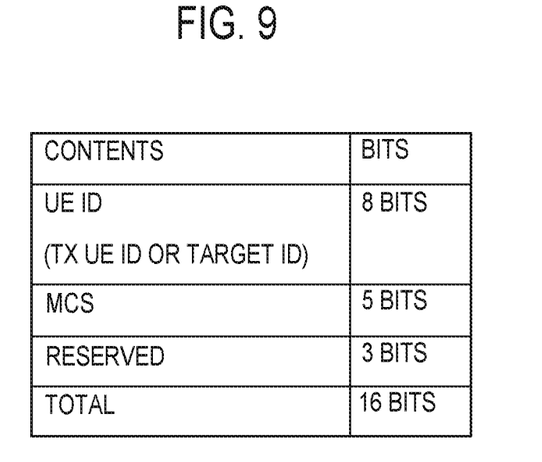
FIG. 9 is a diagram for describing a content of SA.
Figure 10:
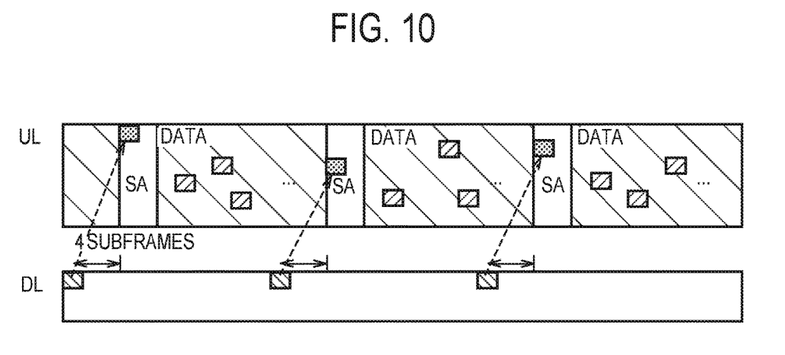
FIG. 10 is a diagram for describing assignment of SA in a first mode.

Next, SA will be described by using FIG. 9 and FIG. 10. FIG. 9 is a diagram for describing a content of SA. FIG. 10 is a diagram for describing assignment of SA in the first mode.

As shown in FIG. 9, SA includes a UEID (UE identifier) and an MCS. The UEID is an ID (TX UE ID) of a transmission source of SA or an ID (Target ID) of a transmission target of SA (that is, user data). For example, the UEID is a bit string of eight bits. A first one bit of the UEID may be information indicating whether or not the user data is transmitted by broadcast. As a result, when user data showing its location by SA is not user data for broadcast and is not data destined to the UE 100, the UE 100 that receives the SA can delete, without decoding, such data.

The MCS shows the MCS of user data. For example, the MCS is a bit string of five bits.

An SA may include predetermined information (Reserved) other than a UEID and an MCS. For example, such information may indicate whether a radio resource used for D2D communication is a radio resource in Mode 1 or a radio resource in Mode 2. Alternatively, the predetermined information may be information (one bit) indicating whether user data (each frequency ID in the frequency direction) is random or persistent in the frequency direction or may be information (one bit) indicating whether the user data is random or SPS (semi-persistent) in the time direction. When user data is SPS in the time direction, the predetermined information may be information indicating a cycle of the SPS.

Further, SA may be retransmitted, and may be retransmitted by HARQ, for example. A radio resource assigned to transmit SA is configured by a plurality of RBs in the frequency direction (see FIG. 8), and the plurality of RBs may include a radio resource for retransmission of the SA. In this case, each of radio resources of a plurality of items of SA is persistent in the frequency direction, and may be selected randomly in the time direction. The RV index pattern of SA may be persistent at 0, for example.

Here, the location of SA is determined by the eNB 200 (relay node) in the first mode. Thus, as shown in FIG. 10, the eNB 200 transmits control information (DCI) indicting the determined location of SA, to the UE 100. The eNB 200 transmits the control information to a subframe that precedes by four subframes from the head of the SA region.

As shown in FIG. 10, in the eNB 200, one item of control information may indicate one item of SA. Alternatively, control information may indicate semi-persistent assignment of resources. In this case, the eNB 200 can transmit control information for releasing a resource when the semi-persistent assignment of resources is ended.

The eNB 200 notifies the UE 100 when control information for indicating the location of SA uses a DCI format 0. In this case, the eNB 200 randomizes a CRC by using a temporary identifier (D2D-RNTI, etc.) assigned for D2D communication in order to indicate that the control information notified to the UE 100 is information for the D2D communication.

Control information indicating the location of SA can include information indicating the frequency direction location of the SA (three bits: 0 to 5) and the time location of the SA (four bits). The time location of SA includes a time location of the SA retransmitted by HARQ.

Control information indicating the location of SA may include information indicating a UEID (Target ID) to which user data is transmitted.

Control information indicting the location of SA may include D2D transmission power information for increasing or decreasing the transmission power in D2D communication.

Control information indicating the location of SA may include information indicating an MCS of user data.

Further, the eNB 200 may transmit, by an RRC message, to the UE 100, power restriction information indicating a maximum interference amount that can be permitted by the eNB 200, in order to decrease interference in cellular communication. The UE 100 can calculate an interference amount (estimated interference amount) applied to the eNB 200, from a pathloss of a downlink, and set transmission power in D2D communication to equal to or less than the maximum interference amount. For example, the UE 100 uses the following expression to calculate transmission power in D2D communication.

$$I_{D2D} = P_{D2D} - PL$$

$$P_{D2D\_Tx} = P_{D2D} \text{ if } I_{D2D} \leq Th_{D2D}$$

$$P_{D2D\_Tx} = PL + Th_{D2D} \text{ if } I_{D2D} > Th_{D2D} \qquad \text{[Expression 1]}$$

$I_{D2D}$: estimated interference amount ($I_{D2D}$=Expected Interference on eNB)
$P_{D2D}$: constant ($P_{D2D}$=Constant)
$P_{D2D\_TX}$: transmission power in D2D communication ($P_{D2D\_Tx}$=D2D Transmit Power)
PL: pathloss of downlink (PL=DL pathloss)
$Th_{D2D}$: D2D interference threshold value ($Th_{D2D}$=D2D interference threshold)

It is noted that the D2D interference threshold value in Expression 1 corresponds to power control information.

Further, the UE 100 can use a correction value in consideration of IBE (in-band emission) (hereinafter, "IBE correction value") when transmission power in D2D communication is set. For example, the UE 100 may use the following expression to calculate transmission power in D2D communication.

$$I_{D2D} = P_{D2D} - \text{IBE correction term}$$

$$P_{D2D\_Tx} = P_{D2D} \text{ if } I_{D2D} \leq Th_{D2D}$$

$$P_{D2D\_Tx} = PL + \text{IBE correction term} + Th_{D2D} \text{ if } I_{D2D} \geq Th_{D2D} \qquad \text{[Expression 2]}$$

Here, when a radio resource in cellular communication and a radio resource in D2D communication are assigned by FDM (Frequency Division Multiplexing), an IBE correction term may be, for example, a value based on a frequency distance from the frequency location of the radio resource in cellular communication to the frequency location of the radio resource in D2D communication. It is noted that the frequency location of the radio resource in the cellular communication may be based on the RB to which the maximum interference is applied.

A parameter for calculating the IBE correction term may be instructed to the UE 100 from the eNB 200. The eNB 200 can instruct a parameter for determining the IBE correction term to the UE 100 by [W, X, Y, Z] dB described in the 3GPP technical report "TR 36.843 V12.0.1", for example.

It is noted that the eNB 200 can broadcast information on an SA resource pool by an SIB.

The information on an SA resource pool includes information indicating the location of a transmission resource pool in the second mode.

Further, the information on an SA resource pool includes information indicating the locations of reception resource pools in the first mode and the second mode.

Further, the information on an SA resource pool may include information indicating that a D2D proximity service is available, in a carrier (cell) used for transmitting an SIB. Alternatively, when information on an SA resource pool is included, it may be possible to indirectly indicate that a D2D proximity service is available.

Conclusion of Embodiment

In the present embodiment, the frequency location of a data resource is determined on the basis of a persistent table where the frequency location of the data resource and the frequency location of SA are made to correspond to each other. Further, the time location of a data resource is determined on the basis of a UEID included in SA. As a result, the time and frequency location of a data resource is indicated appropriately; SA does not need to include the information directly indicating the frequency location and the time location of a data resource, and thus, it is possible to decrease an information amount of the SA.

In the present embodiment, the time location of a data resource is randomly determined on the basis of a UEID. As a result, a case where a data resource used by each of a plurality of UEs 100 overlaps in the time direction can be decreased, and thus, interference based on a difference in transmission power (so-called In-band emission) can be restrained.

In the present embodiment, a UEID used for determining the time location of a data resource is the UEID from which the SA is transmitted or the UEID to which user data is transmitted. As a result, SA does not need to include information directly indicating the time location of a data resource, and thus, it is possible to decrease an information amount of the SA.

Other Embodiments

In the above-described embodiment, a radio resource for D2D communication in the second mode has a configuration similar to a radio resource for D2D communication in the first mode; however, this is not limiting. For example, these radio resources may be configured differently.

The time location of a data resource is determined on the basis of a UEID; however, this is not limiting. For example, the time location of a data resource may be determined, on the basis of the identifier assigned to the UE 100-1 so that a D2D proximity service can be used.

In the aforementioned embodiment, as one example of a mobile communication system, the LTE system is described; however, the present embodiment is not limited to the LTE system, and the present embodiment may be applied to a system other than the LTE system.

It is noted that the entire content of U.S. Provisional Application No. 61/991,015 (filed on May 9, 2014) is incorporated in the present specification by reference.

[Additional Statement]
(A) First Chapter
(1) Introduction

In the first chapter, the focus is on the design details of scheduling assignments for D2D broadcast communication. SA is the control channel that requires to be a robust channel. In order to improve the SA's link performance and efficiency, a fewer number of bits must be used to convey the control information.

(2) SA's Contents

In this section, the SA's physical design is described. In order to reduce the number of bits used for SA transmissions, it is proposed to use the following features:

The SA's frequency position indicates the frequency position of the data.

UE ID sent on SA indicates the time position of the data.

FIG. 8 shows an example for the linkage between the SA and the Data.

(Frequency Allocation)

D2D frequency ID is corresponding to the SA's frequency position used to send the SA which maps to the D2D frequency IDs frequency positions of the data. Positions' pattern of frequency IDs are fixed and can be specified using a table. The mapping between the frequency of the SA and the data positions can be derived from random function.

(Time Allocation)

The randomization is used. The seed is based on UE ID in SA.

Proposal 1: To reduce the number of bits for the SA transmissions, the SA's frequency position indicates the frequency position of the data and UE ID in SA indicates the time position of the data.

(NDI)

If NDIs are supported, NDIs should be multiplexed in DMRS. However, multiplexing NDI and DMRS increases the complexity of the receiver.

Alternatively, a fixed number of retransmission could be specified (e.g., for VoIP support 4 retransmissions can be used). Fixed number of retransmissions will not require sending NDI.

Proposal 2: The number of retransmission is fixed, (e.g., 4) in the specification. NDI is not needed.

(RV)

When the number of retransmission is fixed, RV index pattern can be fixed.

Proposal 3: RV pattern is fixed in the specification, (0, 2, 3, 1) for each retransmission. RV indication is not needed.

Based on the above listed features, SA's contents are shown in FIG. 9. The bit size of SA's contents is fixed.

(3) SA's Repetitions

SA's repetition should be supported to improve the link performance and due to half-duplex constraint. The soft-combining can also be supported to further link performance improvement. SA's RV index should be fixed (e.g., 0). To have a simpler SA design repetition resources should be placed in same frequency positions because the SA's frequency position indicates the frequency position of the data.

Proposal 4: SA's repetition and soft-combining should be supported. SA's RV index should be fixed (e.g., 0).

Proposal 5: SA repetition resources should be placed in same frequency positions because the SA's frequency position indicates the frequency position of the data.

(4) Channel Coding of SA

Figure 11:
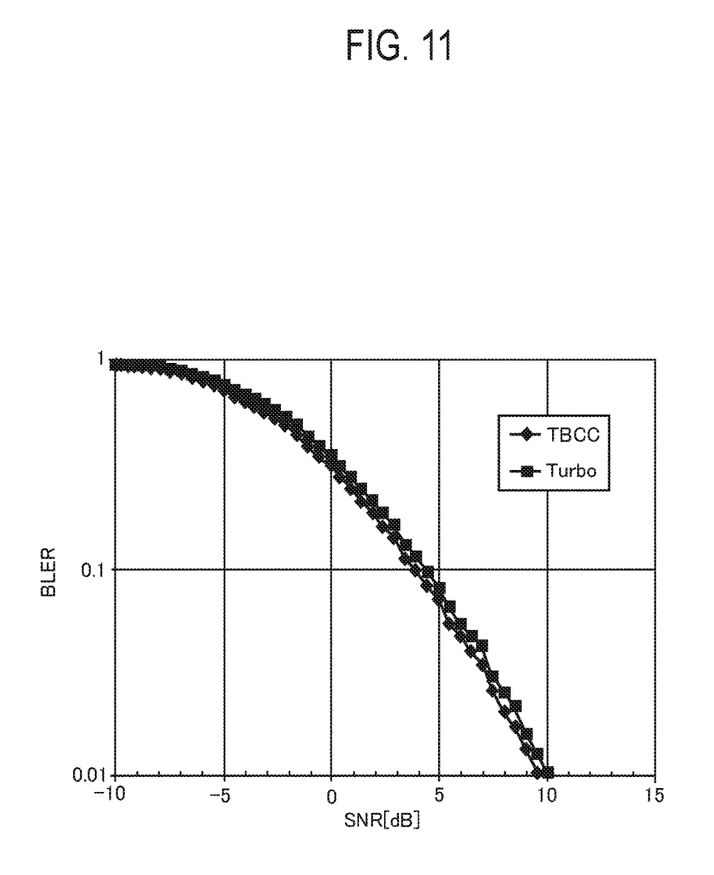
FIG. 11 is a diagram for describing a simulation result of performance of SA channel coding.

In this section the SA's channel coding performance is discussed. It is assumed that the length of SA is 24 bits to simulate the link performance. Comparison of the Tail Biting Convolutional Coding (TBCC) and the Turbo coding is performed. The other simulation assumptions are listed in Appendix A. As shown in FIG. 11, the TBCC performs 0.5 dB better than the Turbo codes.

Proposal 6: TBCC should be used for the SA's channel coding.

(Simulation Assumptions)

Figure 12:
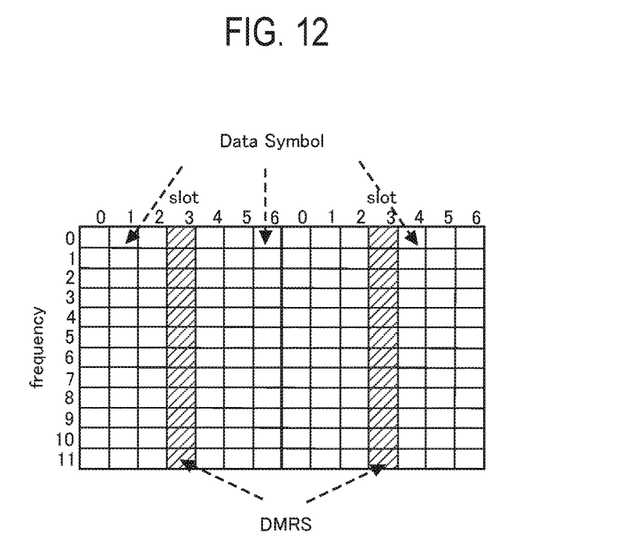
FIG. 12 is a diagram for describing a physical format of SA.

The SA's physical format is shown in FIG. 12. Simulation assumptions are listed in the Table 1.

TABLE 1

| | |
|---|---|
| Carrier frequency | 700 [MHz] |
| System Bandwidth | 10 [MHz] |
| Channel model | ITU-R Umi NLOS w/ dual-mobility |
| Moving direction of Tx UE and Rx UE | Uniform Random (−180-180 [deg.]), independently |
| Number of Tx Antennas | 1 |
| Number of Rx Antennas | 2 |
| Number of RB | 2 |
| Modulation | QPSK |
| Bit length | 24 |
| Channel coding | Tail biting convolutional codes Turbo coding |

TABLE 1-continued

| CRC | 16 bits |
| UE velocities pairs (Tx, Rx) | (3, 3) |
| Channel Estimation | ZF with linear interpolation in time |
| Receiver Type | MRC |

(B) Second Chapter (1) Introduction

In second chapter, details of Mode 2 resource allocation are further considered. SA's physical design is described.

(2) Resource Pool Design

In this section the resource SA and D2D broadcast data pool design is described. To lower the UE complexity it is preferable to have a common PHY design for both mode 1 and mode 2. This will allow the UE receiver to be indifferent to the two types of resource allocation modes. To achieve the above it should define same linkage relation (or mapping) between the SA and the D2D broadcast data for both the modes 1 and 2.

Proposal 1: In order to have low UE receiver complexity a common PHY design should be adopted for both resource allocation Modes 1 and 2. To achieve the above the linkage relation of SA and D2D communication data should be same for both Mode 1 and Mode 2.

(Frequency Domain Allocations of the D2D Resource Pool)

To use a common design for both Mode 1 and Mode 2, a fixed time and frequency size should be defined for the SA region and Data region. We propose 12RBs as the basic unit for the resource pools. In addition, for continuous support for Mode 1 and Mode 2, PUCCH region for in-coverage is reserved as blank. If Mode 1 allocation is not supported in a given carrier, this blank is not needed.

Proposal 2: To use a common design for both Mode 1 and Mode 2, a fixed time and frequency size should be defined for the SA region and Data region.

(Time Domain Allocations of the D2D Resource Pool)

It is a common understanding VoIP will be the most used application for D2D in Rel-12. Under this assumption the SA and D2D communication resource pool timing allocations can be based on VoIP transmissions requirements. Therefore, as VoIP transmission operates on 20 ms intervals, SA and data resource pool period could also be based on multiples of 20 ms. For example, 40 ms period for the SA and data resource pool can be used because longer periods could impact the VoIP latency performance.

Proposal 3: For Rel.12, SA and D2D communication data is specified based on VoIP communication.

Proposal 4: SA and data resource pool's period should be multiples of 20 ms. (e.g., 40 ms)

FIG. 7 is an example of resource allocation for 10 MHz wide bandwidth. For 10 MHz, 3RBs at the top and the bottom are kept blank (Rel-8 PUCCH locations). Resource pool size is 12, 10, 10, and 12 respectively. For example, if the bandwidth is 20 MHz, the number of resource pool is 8. A 3-bits indicator can convey the above configuration sent on a broadcast channel (i.e., PD2DSCH). Resource pool should be selected by Sync Source randomly. The D2DSS is 6RBs wide placed within the SA region.

Proposal 5: A 3-bits indicator can convey the above configuration sent on a broadcast channel. (i.e., PD2DSCH)

Proposal 6: Resource pool should be selected randomly by the Sync Source.

SA should have multi subframes because of the collision and IBE impact. 4 subframes for SA region is proposed.

(3) Linkage Between the SA and the Data

In this section the linkage between the SA and the data allocation is described. A simple design is suggested where the basic unit of the SA and the data are given the same size and the size is 2RBs. The resource allocation method baseline should be random allocation to simplify the specification. FIG. 8 shows the time and frequency domain allocations.

(Time Domain Data Randomization)

Due to half-duplex constraint and to mitigate performance degradation due to the in-band emissions the data can be randomized in time domain. This randomization is based on UEID. As shown in FIG. 8, for example, a UE can randomly select 4 subframes out of 18 to transmit its D2D data.

Proposal 7: Due to half-duplex constraint and to mitigate performance degradation due to the in-band emissions the data can be randomized in time domain.

Proposal 8: Time domain randomization is based on UE ID.

(Frequency Domain Data Randomization)

Frequency domain data randomization helps to achieve frequency-diversity gain and mitigate performance degradation due to in-band emissions. Frequency domain randomization is based on fixed random table and indicated by frequency position of the SA.

Proposal 9: Frequency domain data randomization helps to achieve frequency-diversity gain and mitigate performance degradation due to in-band emissions.

Proposal 10: Frequency domain randomization is based on fixed random table and indicated by frequency position of the SA.

(C) Third Chapter (1) Introduction

In the third chapter, Mode 1 resource allocation details are further considered. The detailed SA physical design is discussed.

(2) SA and Data Resource Pool

In this section the resource SA and D2D broadcast data pool design is described. To lower the UE complexity it is preferable to have a common PHY design for both mode 1 and mode 2. This will allow the UE receiver to be indifferent to the two types of resource allocation modes. To achieve the above we should define same linkage relation (or mapping) between the SA and the D2D broadcast data for both the modes 1 and 2. Further details are described about the resource pool configuration.

(3) D2D Grant for SA Resource Indication

In this section, D2D grant sent on DL by the eNB for the SA transmissions is described. As described above, the Data allocations are mapped to the SA allocations. Therefore, the eNB transmits a SA grant on the DL and no separate grant is sent for the D2D data allocations. The UE receiver can derive the locations of the data transmissions after decoding the SAs. The SA grant sent on the DL is n-$4^{th}$ subframes from the SA region's starting subframe n.

Proposal 1: The eNB transmits a SA grant on the DL and no separate grant is sent for the D2D data allocations.

TABLE 2

| Item | Num of bits |
|---|---|
| SA's position | Frequency position: 3 bits (1 of 6)<br>Time position: 4 bits (all patterns of repetition) |

TABLE 2-continued

| Item | Num of bits |
| --- | --- |
| MCS | 5 bits |
| D2D data power UP/DOWN | 1 bits[FFS] |

Table 2 is DCI for SA Resource Indication.

(4) D2D Power Control

Since D2D operates on the UL carrier, the D2D transmission could cause interference at the eNB receiver and degrade the UL performance. One approach to mitigate this interference at the eNB receiver is to use power control for the D2D transmissions. We propose open loop maximum transmit power restriction and a closed loop power control using DL control channel PDCCH to deliver power control commands to the D2D UE.

Figure 13:
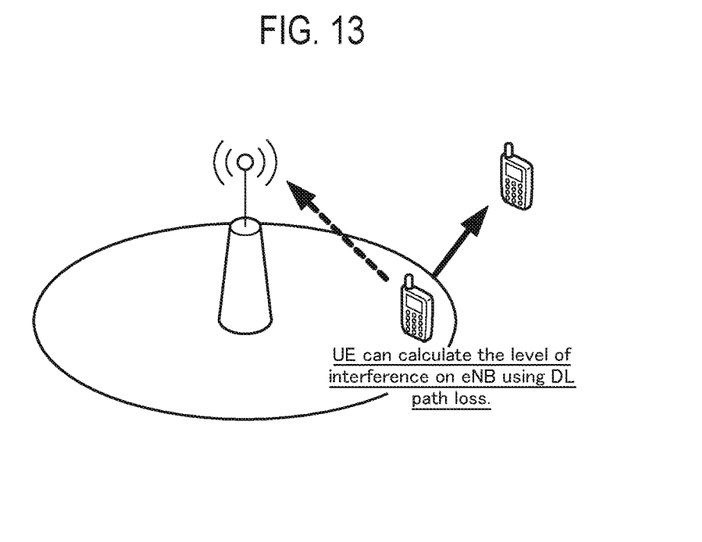
FIG. 13 is a diagram for describing eNB interference calculation.

Using the DL path loss an in-coverage UE could calculate the expected interference power it will cause at the eNB UL receiver as shown in FIG. 13. Therefore, D2D UE could use the above to restrict itself by lowering its transmitting power. The above open-loop Expression 1 can be used by the D2D UE.

Figure 14:
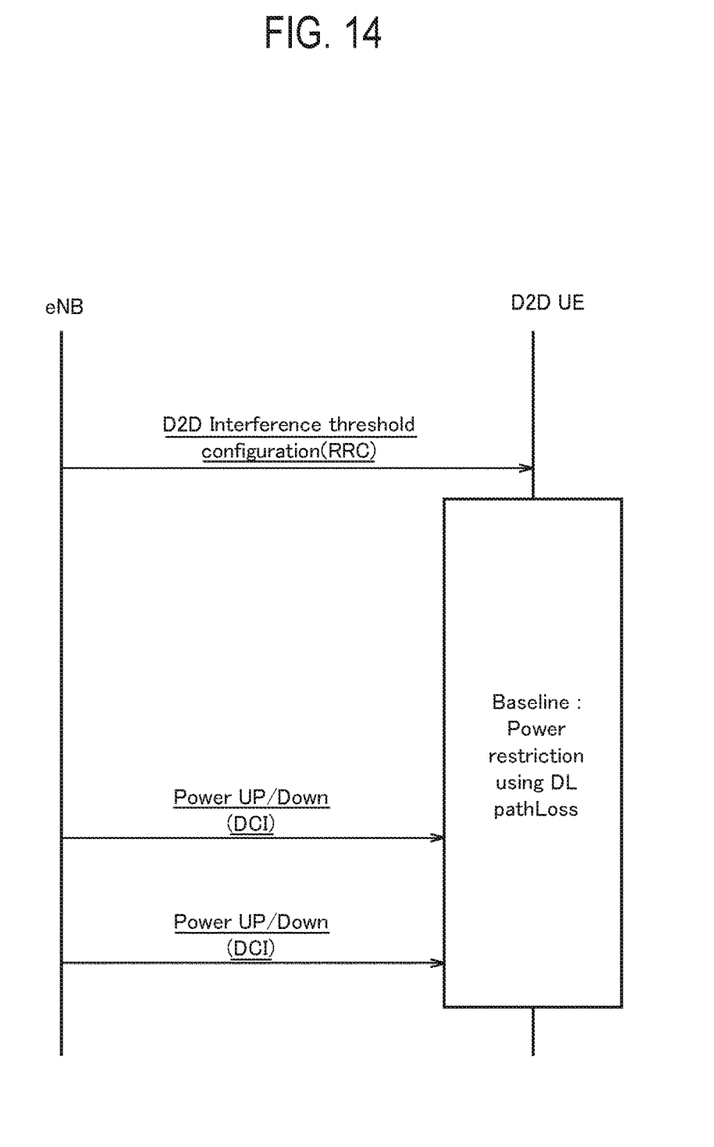
FIG. 14 is a diagram for describing a power control procedure.

Open-loop power control is beneficial for WAN performance improvement. In addition to the open-loop power control, the closed-loop power control can be used if the interference caused by D2D transmissions is over a threshold $Th_{D2D}$. eNB delivers TPC commands using DL control channel (See FIG. 14). For calculating $I_{D2D}$, in-band emission can be considered. $Th_{D2D}$ can be set to infinite, that means no open-loop power control.

Proposal 2: The open-loop and the closed-loop power control should be supported for D2D transmit power control.

INDUSTRIAL APPLICABILITY

As described above, according to the embodiment-based user terminal and processor, it is enabled to decrease amount of information indicating a time-frequency location of a D2D data resource while scheduling assignment information appropriately indicates the time and the frequency location of the D2D data resource. Thus, the present invention is useful in the field of mobile communication.

The invention claimed is:

1. A user terminal comprising:
a transmitter configured to transmit scheduling assignment information indicating a time-frequency location of a D2D data resource by which user data in D2D communication that is direct Device to Device communication is transmitted, wherein
the frequency location of the D2D data resource is determined on the basis of a subframe number assigned for the D2D data transmission,
the time location of the D2D data resource is determined on the basis of an identifier included in the scheduling assignment information,
a fixed number of retransmissions of the scheduling assignment information is specified in the scheduling assignment information,
a new data identifier (NDI) field and a redundancy version (RV) field are exempted from the scheduling assignment information, and
a same frequency location is used for both scheduling assignment information transmissions and scheduling assignment information retransmissions.

2. The user terminal according to claim 1, wherein the time location of the D2D data resource is randomly determined on the basis of the identifier.

3. The user terminal according to claim 1, wherein the identifier indicates an identifier of the user terminal or an identifier of a user terminal to which the D2D data resource is transmitted.

4. A processor configured to control a user terminal, wherein
the processor is configured to execute a process for transmitting scheduling assignment information indicating a time-frequency location of a D2D data resource by which user data in D2D communication that is direct Device to Device communication is transmitted,
the frequency location of the D2D data resource is determined on the basis of a subframe number assigned for the D2D data transmission,
the time location of the D2D data resource is determined on the basis of an identifier included in the scheduling assignment information,
a fixed number of retransmissions of the scheduling assignment information is specified in the scheduling assignment information,
a new data identifier (NDI) field and a redundancy version (RV) field are exempted from the scheduling assignment information, and
a same frequency location is used for both scheduling assignment information transmissions and scheduling assignment information retransmissions.

* * * * *